Patented Sept. 16, 1941

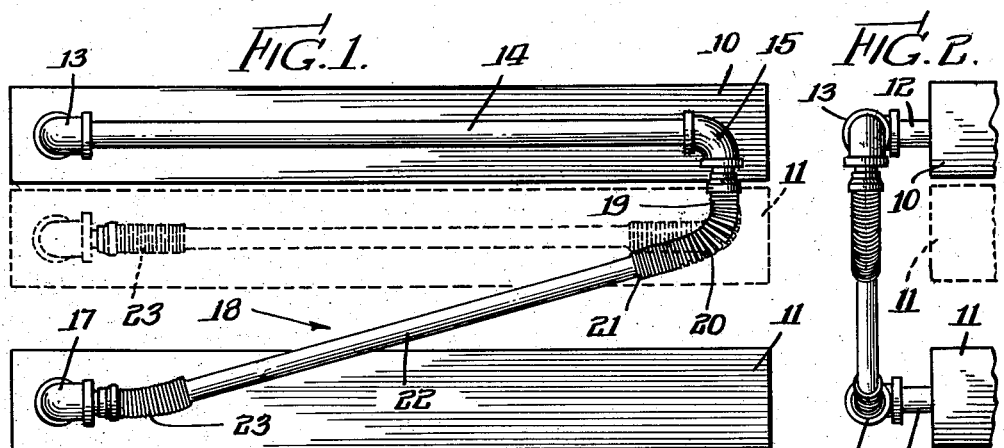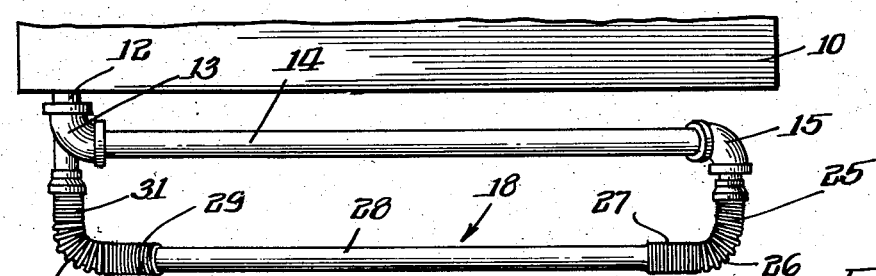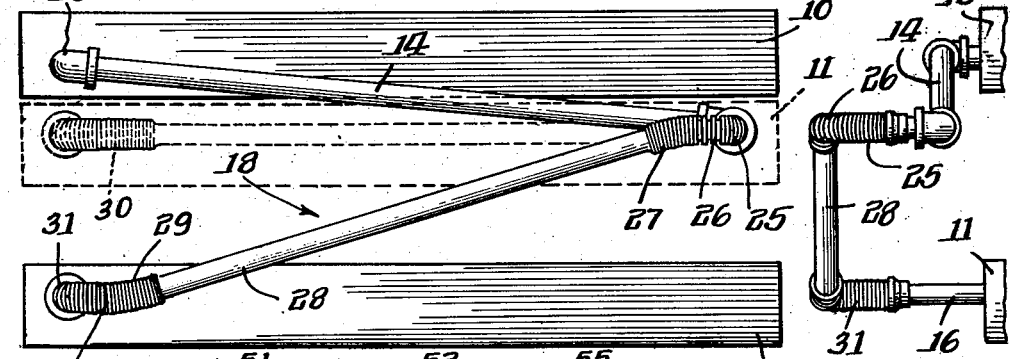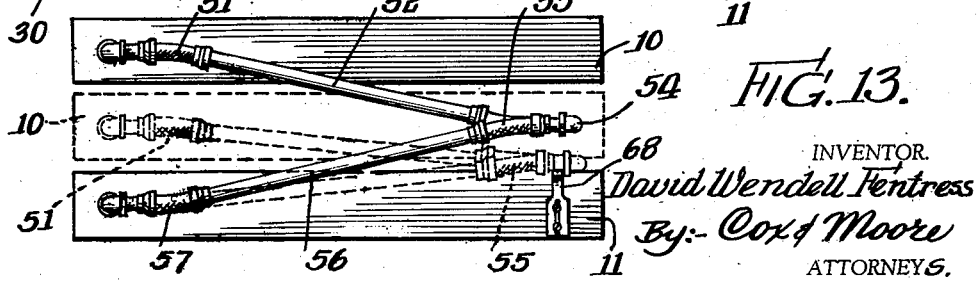

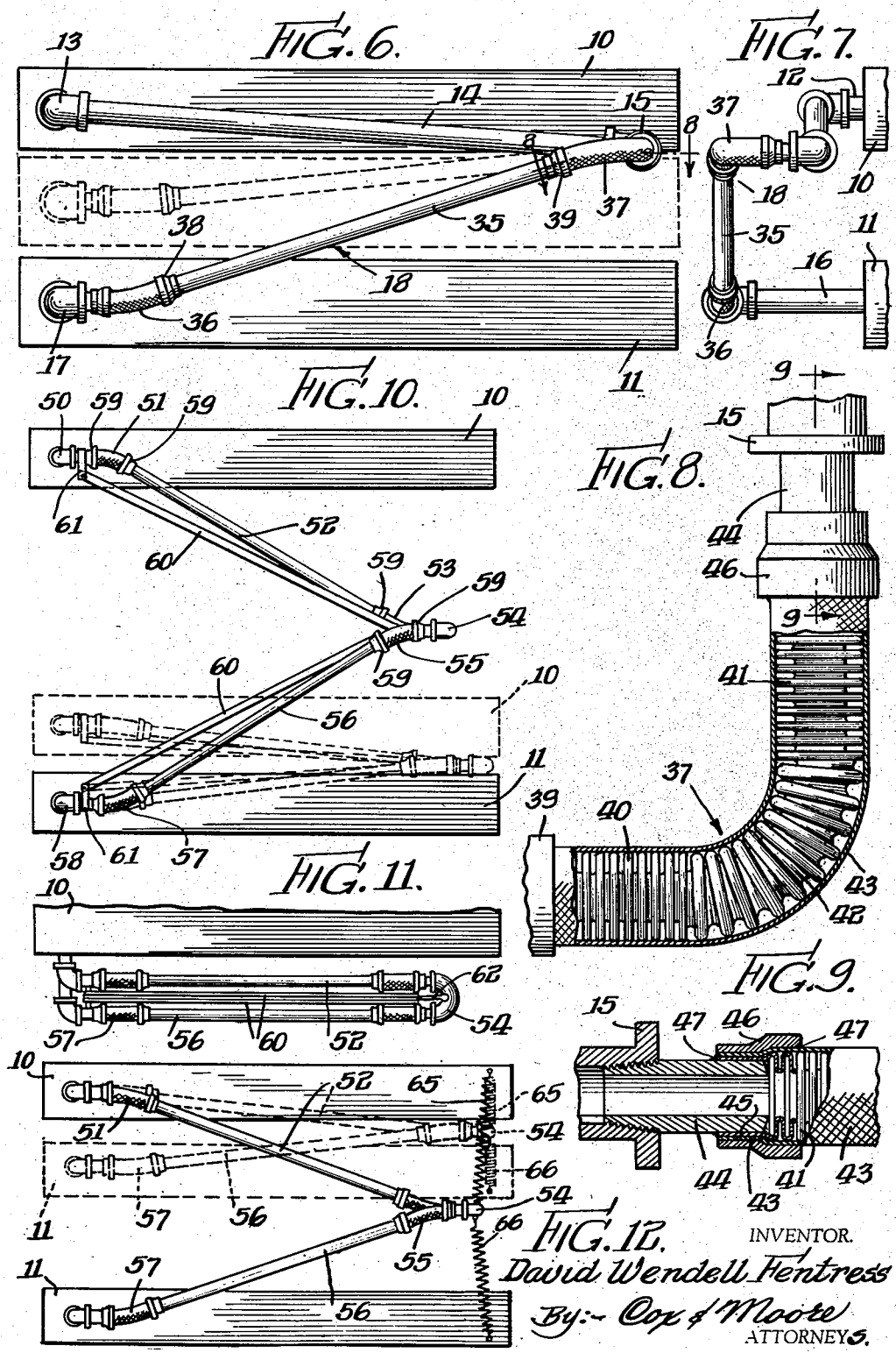

2,256,388

UNITED STATES PATENT OFFICE 2,256,388

FLEXIBLE TUBING CONNECTION

David Wendell Fentress, Hubbard Woods, Ill., assignor to Chicago Metal Hose Corporation, Maywood, Ill., a corporation of Illinois Application December 6, 1938, Serial No. 244,223

4 Claims. (Cl. 285—8)

This invention relates to flexible tubing or hose connections particularly adapted for application to relatively movable parts of machinery, such as the platens of pressing machines or the like.

It is an object of the invention to provide a flexible tubing or hose connection, for forming a fluid conduit between the relatively movable parts of machines, which is of improved and simplified structure and which will be durable and reliable in operation.

More particularly it is an object to provide a conduit connection which will be self-draining at all times and in all positions, while permitting free and unrestricted movement of the connected machine parts.

It is a further object of the invention to provide a flexible conduit connection having rigid sections and flexible sections in longitudinal continuation, the rigid sections imparting support to the connection, and the flexible sections imparting the necessary flexibility to permit free movement. In accordance with the invention the flexible tubing sections are preferably of corrugated tubing to insure a tight connection, the tubing being thin-walled and deeply corrugated to provide ready flexibility.

A further object of the invention is to provide a flexible connection of the type stated having improved means for supporting the connection at all times in self-draining position. In certain forms of the invention the rigid sections of the tubing themselves provide the only required support means. In other forms where a wider range of movement is desired, additional support means may be provided.

A still further object of the invention is to provide a flexible connection of the type stated in which those portions of the connection which are subjected to the maximum strain and wear in use may be readily replaced without the necessity of rebuilding or replacing the remaining parts of the connection.

Still another object of the invention is to provide a flexible connection which may be used to connect relatively movable ports on the machine parts, wherein the ports may be movable from positions in very close proximity.

Other objects and advantages of the invention will appear from the following description when taken in connection with the accompanying drawings wherein certain preferred embodiments of the invention are illustrated.

In the drawings, wherein like reference numerals refer to like parts throughout:

Fig. 1 is a side elevational view of a flexible tubing or hose connection constructed in accordance with one embodiment of the invention.

Fig. 2 is an end view of the connection illustrated in Fig. 1.

Fig. 3 is a top view of a second embodiment of the invention.

Figs. 4 and 5 are side and end views respectively of the embodiment shown in Fig. 3.

Figs. 6 and 7 are side and end views respectively of a third embodiment of the invention.

Fig. 8 is a detail view, partly in section, illustrating the flexible tubing, being taken on the line 8—8 of Fig. 6.

Fig. 9 is a detail showing one suitable form of coupling connection, taken on the line 9—9 of Fig. 8.

Fig. 10 is a side view of an embodiment of the invention employing auxiliary support arms.

Fig. 11 is a top view of the construction shown in Fig. 10.

Fig. 12 illustrates an embodiment employing a spring as an auxiliary support means, and Fig. 13 shows a still further form of auxiliary support.

Referring first to Figs. 1, 2 and 3 of the drawings, the embodiment of the invention illustrated comprises a flexible connection having rigid and flexible tubing sections in longitudinal continuation, forming a fluid conduit between a pair of relatively movable platens 10 and 11, the lower platen being movable between the full line and dotted line positions as shown, and the upper platen in this instance being stationary. While the invention has been illustrated as applied to platens such as may be used on pressing machines or the like, the connection of the invention being used to form a fluid conduit between the relatively movable platens, it is to be understood that the invention may be used to connect the relatively movable parts of various types of machines wherein a fluid conduit or connection between such parts is desired, whether both or only one of such parts is adapted to be moved.

The connection comprises a pipe 12 secured to the upper platen 10, an elbow 13, another and longer pipe 14 and a second elbow 15, all secured together and forming a rigid piping connection. These parts may be screw threaded together in fluid-tight arrangement, in the manner conventionally used for connecting ordinary iron piping. Another pipe 16 and elbow 17 are connected to the lower platen 11. Between the elbows 15 and 17 there is arranged a piece of tubing, generally indicated by the reference numeral 18, having a corrugated flexible section 19, a corrugated substantially rigid elbow section 20, a flexible corrugated section 21, a non-corrugated rigid section 22 and a corrugated flexible section 23. The tubing 18 is preferably of thin-walled material, which may be stainless steel, and the flexible corrugated sections 19, 21 and 23 are deeply corrugated whereby to impart maximum flexibility to these sections. The pipes 12, 14 and 16, and their associated elbow connections, may be ordinary iron piping. Any suitable coupling connections may be employed for connecting the tubing 18 to the piping elbows 15 and 17, and one suitable form of coupling connection will be later described.

In operation, as the lower platen moves from its full line to its dotted line position, or to any position between these limits, the flexible sections 19, 21 and 23 of the tubing 18 will yield to permit the necessary movement of the conduit. As the lower platen is raised, the rigid tubing section 22 will be thrust to the right as seen in Fig. 1, and the flexible tubing section 19 will absorb this horizontal movement. The flexible sections 21 and 23 yield to permit the change in inclination of the rigid tubing section 22. The elbow tubing section 20 remains substantially unyielding. During operation the rigid piping connections 12, 13, 14 and 15 remain immovable with the upper platen 10, and form a support structure for the tubing 18, eliminating the necessity for auxiliary support means, such as supporting arms or the like. Not only is the entire conduit thus supported by its upper rigid sections, but it is so supported that in all positions of operation it will be maintained in self-draining condition, the formation of any sag pockets in which fluid could accumulate being avoided. When the platens are separated as shown in Fig. 1, it will be seen that no pockets are formed in the conduit for the accumulation of fluid. As the lower platen moves upwardly, the tubing section 22 gradually assumes a horizontal position, reaching horizontal as the lower platen reaches its extreme uppermost position. In all positions the rigid pipe 14 supports the outer U-portion or right-hand end of the conduit so that no portion of the conduit may sag below the uppermost position of the port in the lower platen.

In the event the flexible sections of the tubing 18 which are submitted to the maximum strain and wear should need replacement, the tube 18 may be replaced without replacement of the other conduit members.

In Figs. 3, 4 and 5 an embodiment of the invention is illustrated which is generally similar to that previously described, except for the position and arrangement of the corrugated tubing member. This construction is particularly adapted for use where the ports of the platens are movable to a position in very close proximity.

In this instance the upper rigid pipe section 14 is inclined so that its lower or outer end is substantially coincident with the horizontal axis of the lower platen port when the platen is in its uppermost position, and the elbow member 15 is horizontally rather than vertically disposed, as in the embodiment of the invention previously described. The tubing 18 is provided with a flexible corrugated section 25 connected to the elbow member 15, a substantially rigid elbow section 26, a flexible corrugated section 27, a non-corrugated section 28, a flexible corrugated section 29, a corrugated substantially rigid elbow section 30, and a flexible corrugated section 31 directly secured to the lower pipe 16 which is connected to the lower platen. The flexible sections 25 and 31 are horizontally disposed.

In operation as the lower platen is moved upwardly, the horizontal thrust imparted to the tubing section 28 will be absorbed by both of the flexible sections 25 and 31, instead of by a single flexible section as in the previously described embodiment. By distributing the stress to two sections, the flexing movement is reduced and the life of the tubing is increased. Due to the horizontal positioning of the ends 25 and 31 of the tubing member 18, the U-portion or bight of the conduit, shown to the right in Figs. 3 and 4, lies in a horizontal plane, instead of in a vertical plane as in Fig. 1. This arrangement permits the ports of the platens, to which the ends of the conduit are connected, to be moved very close together. When the U or bight portion of the conduit is arranged in a vertical plane, the platen ports may not be moved closer together than the distance across the U, or sag pockets will be formed in the conduit. This difficulty is avoided by the horizontal construction illustrated in Figs. 3, 4 and 5. In this embodiment of the invention the upper rigid pipe sections 12, 13, 14 and 15 support the outer or bight portion of the conduit as before, without the aid of auxiliary support means. The conduit will be self-draining in all positions of the movable platens.

In Figs. 6 and 7 an embodiment of the invention is illustrated which is generally similar to that shown in Figs. 3, 4 and 5, except that the inclination of the upper rigid pipe member is reduced, and the structure of the corrugated conduit is modified. In this instance the lower end of the rigid pipe member 14 is arranged midway between the ports of the platens when they are in closed position, instead of substantially coincident with the position of the lower port, as in the previously described structure. Also, the lower tubing 18 is made of individual parts secured together, rather than of a single piece of metal having corrugated and non-corrugated sections. It comprises a non-corrugated tubing member 35, a piece of corrugated tubing 36 and a piece of corrugated tubing 37, the corrugated tubings 36 and 37 being secured to the ends of the tubing 35 by means of suitable coupling connections 38 and 39. The corrugated member 36 may be substantially similar to the tubing section 23 shown in Fig. 1, except that it is covered by some suitable metal braid. The corrugated tubing 37 may be likewise covered with metal braid, being otherwise the same as the tubing sections 25, 26 and 27 of Fig. 4.

In this form of construction, wherein the tubing sections 35, 36 and 37 are individual pieces, either of the members 36 or 37 which may become worn, can be individually replaced without the necessity of replacing any of the other portions of the conduit. The reduced inclination of the fixed pipe 14 maintains the lower tubing member 35 in inclined position even when the platens are closed, thus further facilitating the self-draining of the conduit.

The tubing member 37 and one suitable form of coupling connection therefor are illustrated in Figs. 8 and 9. It will be seen that the tubing member comprises deeply corrugated sections of annularly corrugated tubing 40 and 41 connected by a corrugated substantially rigid elbow section 42, the tubing sections being encased in a metal braid 43.

As shown in Fig. 9, the tubing may be connected to the pipe elbow 15 by means of a nipple 44 threaded into the elbow 15 and to which the end of the tubing is secured. The extreme end 45 of the tubing is drawn over the nipple, and this tubing end together with the braid 43 are clamped on the nipple by a sleeve member 46. The tube may be additionally brazed or soldered to the nipple as indicated at 47.

In Figs. 10 and 11 an embodiment of the invention is illustrated wherein auxiliary support arms are employed for supporting the conduit in self-draining position. In this form of construction the conduit or flexible connection comprises a pipe 50 connected to the upper platen, a piece of flexible corrugated tubing 51, a piece of non-corrugated tubing 52, a corrugated tubing member 53, a U-bend pipe 54, a corrugated tubing member 55, a non-corrugated tubing 56, a corrugated tubing 57, and a pipe 58 connected to the lower platen. Coupling connections 59 are provided at each end of the four corrugated tubing members for connecting the members to the pipes 50 and 58, the non-corrugated tubes 52 and 56, and to the U-bend 54. A pair of support arms 60 are pivotally connected at their inner ends to the pipes 50 and 58 by means of brackets 61, and at their outer ends to an extension member 62 fixed to the U-bend 54. As the platens are operated, in this instance the upper platen being shown movable, the support arms 60 will maintain the bight or U-portion of the conduit midway between the platens in all positions, thus insuring drainage. The return bend member 54 is held horizontally disposed permitting the ports of the platen members to be brought very closely together if necessary.

In Fig. 12 an arrangement is shown substantially similar to the structure shown in Figs. 10 and 11 except that in this instance the bight portion of the hose is held in position by a pair of coil springs 65 and 66, each spring being secured at one end to one of the platens and at its other end to the bight portion of the conduit. The springs are of equal strength, and as the platens are moved, the springs will stretch an equal amount holding the bight portion of the conduit midway between the platens in all positions. The springs also permit the necessary horizontal movement which the bight portion of the conduit experiences during platen movement.

In Fig. 13 a still further arrangement is shown for supporting the bight portion of the conduit or flexible connection in self-draining position. In this embodiment an abutment or support rest 68 is secured to the lower platen, being so positioned that it is adapted to contact and support the bight portion of the conduit when the platens are closed. As the platens are separated, the bight of the conduit may move upwardly from the support, but as the platens are closed, the support will contact the bight of the conduit and prevent any portion thereof from sagging. The conduit is thus maintained in self-draining position at all times.

It is obvious that various changes may be made in the specific embodiments set forth for purposes of illustration without departing from the spirit of the invention. The invention is, therefore, not to be limited to the specific embodiments shown and described but only as indicated in the following claims.

The invention is hereby claimed as follows:

1. A flexible fluid flow connector for connecting relatively movable parts of machines, said connector comprising a conduit having generally horizontally disposed outflow and inflow sections connected by a bight portion, one of said sections being a rigid pipe rigidly connected to one of said machine parts whereby to prevent the conduit from sagging, and the other of said sections being connected to the other of said machine parts and including a flexible tubing whereby to accommodate for the relative movement between the machine parts.

2. A flexible fluid flow connector for connecting relatively movable parts of machines, said connector comprising a conduit having generally horizontally disposed outflow and inflow sections connected by a bight portion, one of said sections being a rigid pipe rigidly connected to one of said machine parts whereby to prevent the conduit from sagging, and the other of said sections being connected to the other of said machine parts and comprising a rigid pipe section and a flexible pipe section arranged at each end thereof whereby to accommodate for the relative movement between the machine parts.

3. In combination with upper and lower relatively movable platens, a flexible conduit connected to said platens, said conduit comprising generally horizontally disposed upper and lower flexible sections connected by a bight portion, and a pair of opposed tension springs connected to said platens and to said bight portion for supporting the latter, said springs and platens constituting the sole supporting means for the conduit.

4. A flexible fluid flow connector for connecting relatively movable parts of machines, said connector comprising a conduit having generally horizontally disposed outflow and inflow sections connected respectively to the machine parts, and a connecting bight portion, each of said sections comprising a rigid pipe extending throughout the major length of said section, and at least one of said sections having a flexible pipe portion at each end of its associated rigid pipe portion, whereby the conduit bight portion is continuously supported during movement of the machine parts in a predetermined draining position.

DAVID WENDELL FENTRESS.